United States Patent
Wolf

[15] 3,704,844
[45] Dec. 5, 1972

[54] GLARE SHIELD ASSEMBLY
[72] Inventor: Walter C. Wolf, Los Angeles, Calif.
[73] Assignee: Thernodyne International, Ltd.
[22] Filed: Dec. 14, 1970
[21] Appl. No.: 98,000

[52] U.S. Cl. .................................244/121, 296/97 R
[51] Int. Cl. .................................................B60j 3/02
[58] Field of Search..244/121; 296/97 R, 97 C, 97 E, 296/97 G; 9/8

[56] References Cited

UNITED STATES PATENTS

| | | | |
|---|---|---|---|
| 2,813,749 | 11/1957 | Wetig | 296/97 E |
| 3,282,623 | 11/1966 | Paro | 296/97 E |
| 2,925,302 | 2/1960 | Vanden Bosch | 296/97 E |
| 2,963,316 | 12/1960 | Matthews | 296/97 E |
| 2,791,272 | 5/1957 | Stehlik | 296/97 E |
| 1,929,314 | 10/1933 | Ishii | 296/97 E |
| 3,315,285 | 4/1967 | Farmer | 9/8 |

*Primary Examiner*—Milton Buchler
*Assistant Examiner*—Barry L. Kelmachter
*Attorney*—Limbach, Limbach & Sutton

[57] ABSTRACT

A glare shield assembly for an aircraft instrument panel includes a base panel mounted to shield the instrument panel and a number of extension panels which can be slidably moved to extend the area of the glare shield. The extension panels desirably are made of a high heat-resistant, flexible thermoplastic material and are mounted on a telescoping sliding guide channel which, in turn, is hinged such that in the event of an ejection of the pilot from the aircraft, the extension panels rotate about the hinged portion to a cleared position upon impact thereto by, for example, the knees of the pilot.

10 Claims, 4 Drawing Figures

PATENTED DEC 5 1972          3,704,844
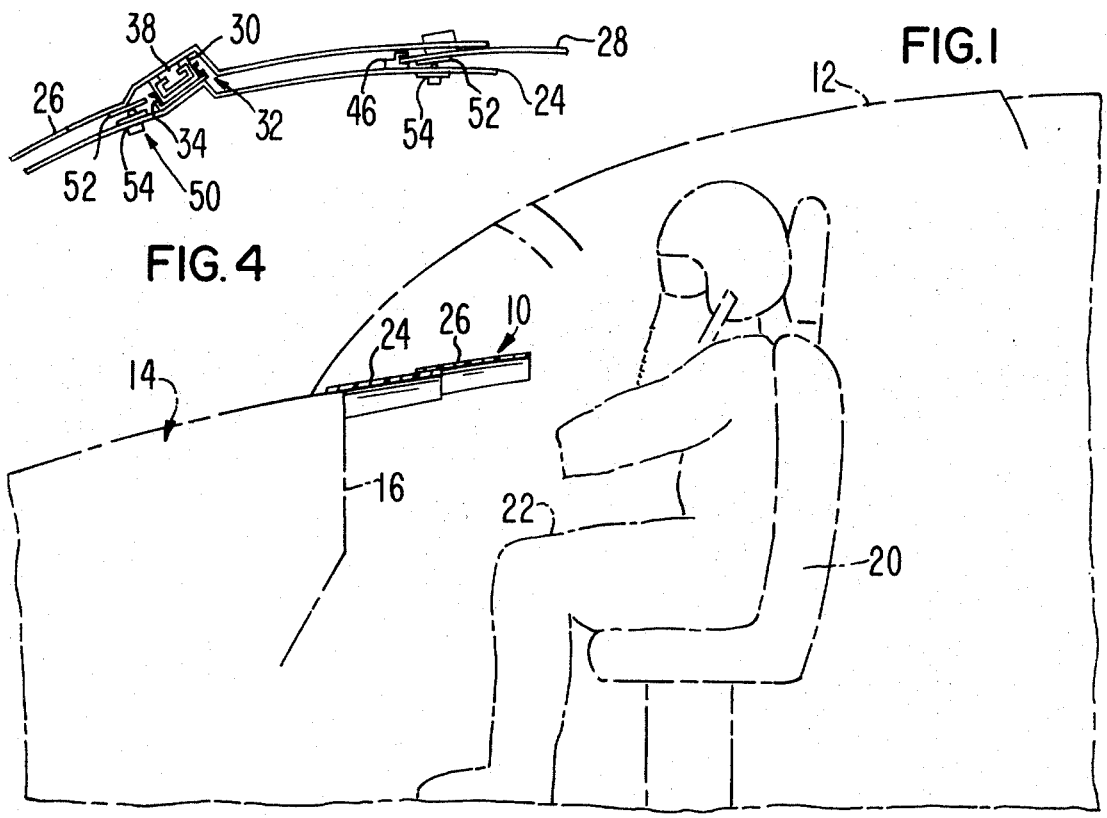
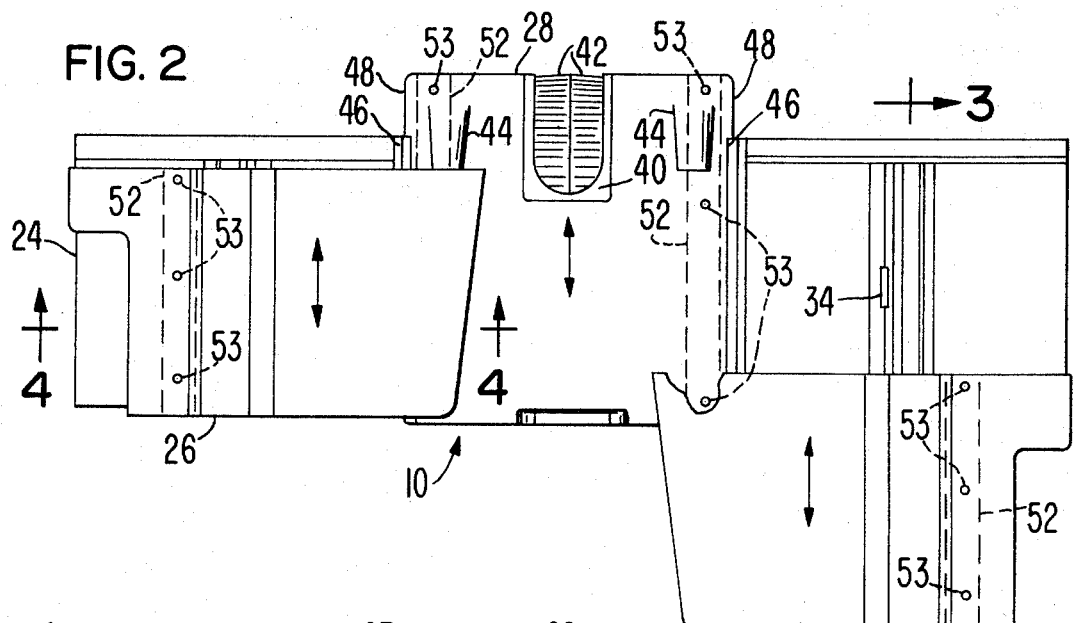
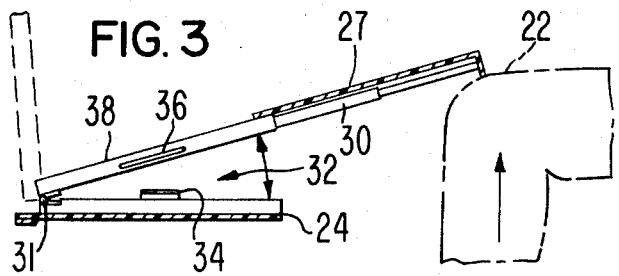
INVENTOR.
WALTER C. WOLF

GLARE SHIELD ASSEMBLY

BACKGROUND OF THE INVENTION

The present invention relates to a glare shield assembly to enable a pilot to more easily read the instrument panel of an aircraft, and more particularly to a glare shield assembly which additionally insures the safety of a pilot striking the glare shield assembly during an ejection from the aircraft.

In a jet aircraft such as a single-seated fighter aircraft, the pilot sits in a cockpit facing the direction of flight with the instrument panel directly, and slightly below, his straight-forward line of sight. The instrument panel controls are typically illuminated by low-illumination lights. During the night time it is very easy for the pilot to read the control panels because of the ambient darkness surrounding the cockpit and the instrument panel. However, during the day time the glare created from the sun and other outside lighting conditions often makes it very difficult for the pilot to read his instrument panel, radar, etc. because of the glare intensity relative to the intensity of the illuminated dials and controls.

Thus, to alleviate the problems created by glare, jet aircraft have been equipped with glare shield assemblies which, in the past, have been made of a material such as fiberglass and which are mounted generally perpendicular with the base of the instrument panel to shield the instrument panel from outside sources of glare. In prior art glare shield assemblies, it is possible to extend the area of the glare shield by slidably moving extension panels from unextended to extended or intermediate positions. Prior art glare shield assemblies have used aluminum telescoping guide members to allow the pilot to extend the extension panels.

Present glare shield assemblies using fiberglass sliding panels with aluminum guides have several serious inherent disadvantages. With the extension panels in the extended position, the knees of the pilot are located directly below the extended panels. If it is necessary for the pilot to ditch his aircraft, the procedure is to press an ejection button at which time the cockpit cover flies off and the chair and pilot are ejected vertically from the aircraft. With the extension panels extended, this results in the knees of the pilot striking the extension panels.

This presents a very serious hazard to the pilot in an aircraft using present glare shield assemblies for several reasons. First, the force of the impact against the rigid fiberglass panels or the aluminum guide members on the knees of the pilot has caused bodily injury to the pilot.

Secondly, the force of the impact has caused damage to the flight suit of the pilot. At altitudes where jet aircraft fly, any damage to the flight suit of the pilot is potentially a very dangerous situation.

A third disadvantage is that since fiberglass is a comparatively rigid material, the impact on the rigid glare shield assembly by the knees of the pilot on ejection causes shattering of the fiberglass material. These fragments are extremely dangerous to the pilot at aircraft speeds.

A fourth difficulty with fiberglass and aluminum glare shield assemblies is the maintenance problem. During the time that the area of the cockpit is being repaired, serviced, etc., it is very easy for a rigid prior art glare shield assembly to be bumped by a maintenance personnel and thereby breaking or cracking it. Likewise, the glare shield assembly could easily be broken by the pilot during the operation of the aircraft. When this happens, it is necessary to completely replace the glare shield assembly which is both a troublesome and expensive process.

SUMMARY OF THE INVENTION

It is, therefore, an object of the present invention to provide an improved glare shield assembly for an aircraft.

It is further an object of the present invention to provide a glare shield assembly for shielding the instrument panel of an aircraft from ambient light which can cause no damage to a pilot during the ejection of the pilot from the aircraft at a time when the aircraft is ditched.

Another object of the invention is to provide an assembly for shielding the instrument panel of an aircraft from glare from outside of the cockpit of the aircraft which can be extended to a number of discrete positions and which is mounted such that any impact thereon by a pilot during ejection from the aircraft causes the glare shield assembly to be moved to a cleared position, thereby insuring the safety of the pilot and his flight suit during the ejection.

Still another object of the present invention is to provide a glare shield assembly which is flexible and virtually shatter-proof.

In accordance with the present invention a glare shield assembly for an aircraft is provided having one or more slidable extension panels mounted on a base panel. The extension panels are mounted by telescopic guide or slide members which permit the extension panels to be slidably moved to an extended position to provide more shielding surface area. The guide channels are connected at the non-extending end to the base panel by a hinged member. The guide channel is biased in juxtaposition with the base panel. The biasing arrangement yields to a predetermined impact force, such as that of the upward movement of the knee of a pilot during ejection, to allow the extension member to be rotated to a cleared position, thereby alleviating any injury to the pilot or to his suit.

In the preferred embodiment, the glare shield assembly panels are made of a flexible, thermoplastic material which will not shatter upon impact. Further, the guides are made of a self-lubricating high heat-resistant material such as nylon or teflon. This also reduces the chance of injury to the pilot during ejection and also reduces the possibility of inadvertant damage to the glare shield assembly during the operation and maintenance of the aircraft.

BRIEF DESCRIPTION OF THE DRAWINGS

FIG. 1 is an elevational view, in section and partially in phantom, of a glare shield assembly within a cockpit of an aircraft;

FIG. 2 is a top view of the glare shield assembly of the present invention;

FIG. 3 is a sectional view of the glare shield assembly of FIG. 2 in a direction indicated by the arrows in FIG. 2; and FIG. 4 is a cross-sectional view of a portion of the glare shield assembly of FIG. 2 taken in a direction and position indicated by the arrows in FIG. 2.

DESCRIPTION OF THE PREFERRED EMBODIMENTS

In FIG. 1 a glare shield assembly 10 is mounted within the cockpit of an airplane 14. The glare shield assembly 10 is mounted substantially perpendicular to the face of the instrument panel 16 which includes the dials and controls, radar, etc. used and observed by the pilot 18 during the operation of the aircraft. The pilot 18 sits on a chair 20 which, at any time the pilot finds it necessary to ditch the aircraft, is ejected vertically upward, while the cockpit 12 is simultaneously thrown off.

It can be seen that when the glare shield assembly 10 is in the extended position as shown in FIG. 1, the knee and possibly other parts of the anatomy of the pilot 18 will strike the bottom of the glare shield assembly when he is ejected vertically. As pointed out above, unless provision is otherwise made, this impact can result in severe bodily damage to the pilot as well as damage to his flying suit.

Referring to FIGS. 2, 3 and 4, the improved glare shield assembly 10 of the present invention includes a base panel 24, a pair of extension panels 26 and 27, and an additional, centrally located sliding extension panel 28. The size and location of the extension panels 26 and 27 are such that when extended as illustrated by panel 27 in FIG. 2, the knees of the pilot 18 are located directly below the respective extension panels.

The extension panels 26 and 27 are slidably mounted by means of telescoping guide or slide members 30 which extend in a perpendicular direction from the instrument panel 16 to permit movement of the extension panels 26 and 27 in a direction away from the instrument panel to afford a greater shielding area.

The telescoping guide member 30 is rotatably attached to the base panel 24 by means of a hinge 31. Normally, the extension panels 26 and 27 are juxtaposed against the base panel 24 as illustrated in FIG. 1. To hold the extension panels in this position, biasing means 32 are provided which comprise, in the embodiment illustrated, a spring-clip member 34 which engages receiving slots 36 disposed on opposite sides on the largest segment 38 of the telescoping guide member 30.

During, for example, an ejection of the pilot 18, with the one or both of extension panels 26 and 27 extended outwardly, his knee 22 strikes the underside of either or both of the extension panels. The force of the impact overrides the biasing effect of the clamp spring 34 and the extension panel(s) pivots about the hinge 31 to a cleared position indicated by the phantom lines. Thus, instead of the extension panel shattering on impact, or injuring the pilot, or damaging his flying suit, the extension panel moves to a cleared position and no injury results therefrom.

The central sliding panel 28, unlike the extension panels 26 and 27, is not pivotally hinged to the base panel 24 since the knees 22 of the pilot do not strike panel 28 during an ejection. The central sliding panel 28 includes a bomb-sight opening 40 comprising oppositely disposed brush members 42 through which the bomb-sight extends. The brush portions 42 act to block light through the glare shield assembly 10 and onto the control areas. The central sliding panel 28 additionally includes stop members 44 which prevent the extension panels 26 and 27 from being inserted too far back.

The sliding panel 28 is inserted and withdrawn by use of guide or slot members 46 which engage the side edges 48 of the sliding panel 28.

Both the extension panels 26 and 27, and the sliding panel 28 are arranged to be moved to one of a plurality of discrete extended positions. This is accomplished by means of a detent means 50 provided for each of the extension panels 26 and 27 and for the sliding panel 28.

Each of the detent means 50 includes a strip member 52, having a plurality of receiving recesses 53 thereon, attached to each of the extension panels. Oppositely disposed thereto is a male detent member 54 which engages the receiving recesses in the strip members 52 at the desired extended locations.

In accordance with the invention the telescoping guide members 30, the guide members 46, and the spring clips 34 are made of a self-lubricating, high heat-resistant material such as nylon or teflon. These materials are superior to the previously used aluminum members since they are flexible and, therefore, are apt to cause less damage to the pilot of the aircraft during an ejection. They are highly heat-resistant for safety purposes. The base panel 24, the extension panels 26 and 27, and the sliding panel 28 are all made from a flexible, thermoplastic, fire-retardant material such as acrodyne-butudyne-styrene. This type of material is far better than the previously used fiberglass since it is flexible and virtually unbreakable, and therefore less dangerous to the pilot of the aircraft.

The panels can be made by well known thermal molding techniques. In one embodiment, the thickness of the acrodyne-butudyne-styrene material used was 0.060 inches.

Thus, it can be seen that the glare shield assembly of the present invention, due to the hinged arrangement of the extension panels, and additionally due to the use of flexible, shatter-proof materials affords greater safety to the pilot of an aircraft having such a glare shield assembly and also enables maintenance people to service the aircraft without fear of damaging or breaking the glare shield assembly and having to replace it with a new one.

I claim:

1. Glare shield assembly for an aircraft instrument panel comprising:
   a. a base panel stationarily mounted to shield the instrument panel;
   b. at least one extension panel utilized to increase the area of the glare shield; and
   c. means for mounting said extension panels to said base panel, said mounting means comprising
      i. a telescoping guide channel for each of said extension panels for permitting said extension panels to be slidably moved to an extended position,
      ii. said guide channels being hingedly mounted at the non-extending end thereof, and
      iii. means for biasing said guide channel to a juxtaposed relationship with said base panel, said biasing means yielding to permit said extension panel to rotate to a cleared position upon a predetermined upward impact thereto.

2. Glare shield assembly as in claim 1 wherein said guide channels are made of a self-lubricating, high heat-resistant material.

3. Glare shield assembly as in claim 2 wherein said material comprises nylon.

4. Glare shield assembly as in claim 2 wherein said material comprises teflon.

5. Glare shield assembly as in claim 1 including means for maintaining said extension panels in any one of a plurality of discrete extended positions.

6. Glare shield assembly as in claim 5 wherein said maintaining means comprises a detent means.

7. Glare shield assembly as in claim 5 wherein said detent means comprises a member mounted to said extension panel having a plurality of detent receiving recesses, and a male member mounted to said base panel and aligned to engage and disengage said receiving recesses.

8. Glare shield assembly as in claim 1 including a centrally-located sliding extension panel.

9. Glare shield assembly as in claim 1 wherein said base and extension panels are made of a flexible, fire-retardant thermoplastic material.

10. Glare shield assembly as in claim 9 wherein said glare shield assembly additionally includes a centrally-located, additional sliding extension panel, detent means for maintaining said extension panels in any one of a plurality of discrete extended positions, and wherein said guide channels are made of a self-lubricating, high heat-resistant material.

* * * * *